United States Patent [19]
Nelson, Jr.

[11] 4,094,458
[45] June 13, 1978

[54] REUSABLE, COLLAPSIBLE SHIPPING CONTAINER

[75] Inventor: Bennie Charles Nelson, Jr., Chicago, Ill.

[73] Assignee: The Continental Group, Inc., New York, N.Y.

[21] Appl. No.: 775,040

[22] Filed: Mar. 7, 1977

[51] Int. Cl.² .......................... B65D 5/10; B65D 5/36
[52] U.S. Cl. ................................. 229/39 R; 229/41 B
[58] Field of Search ................. 229/41 R, 39 R, 41 B

[56] References Cited

U.S. PATENT DOCUMENTS

| | | | |
|---|---|---|---|
| 1,668,800 | 5/1928 | Bonfield | 229/41 B |
| 1,971,863 | 8/1934 | Lupton | 229/41 B |
| 2,645,405 | 7/1953 | Dorfman | 229/41 B |
| 3,366,308 | 1/1968 | Phillips, Jr. | 229/41 B |
| 3,371,845 | 3/1968 | Freiman | 229/39 R |
| 3,411,691 | 11/1968 | Whitaker et al. | 229/41 B |
| 3,565,325 | 2/1971 | Pugsley | 229/41 B |
| 3,642,192 | 2/1972 | Wilcox, Jr. et al. | 229/41 R |
| 3,655,116 | 4/1972 | Tanner | 229/39 R |

Primary Examiner—William Price
Assistant Examiner—Allan N. Shoap
Attorney, Agent, or Firm—Diller, Brown, Ramik & Wight

[57] ABSTRACT

This disclosure relates to a reusable, collapsible shipping container which includes a plurality of end and side panels and a plurality of top and bottom flaps joined to the end and side panels by hinge lines, each bottom flap being divided by a longitudinal hinge line into first and second portions, adhesive means for securing the first and second portions of a first of the bottom flaps to respective second and first portions of a second of the bottom flaps thereby generally aligning their respective longitudinal hinge lines, and a transverse hinge line generally centrally located along each of first and second of the end panels and their respective top and bottom flaps whereby the container is movable between collapsed and set-up conditions.

11 Claims, 8 Drawing Figures

U.S. Patent June 13, 1978 Sheet 2 of 2 4,094,458
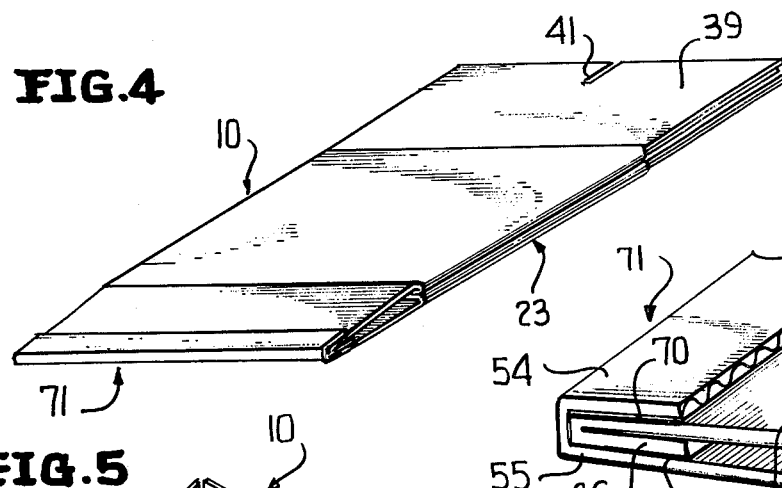
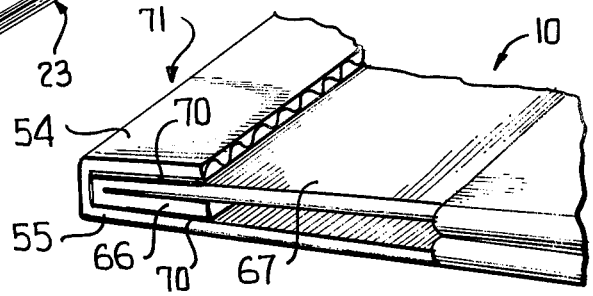
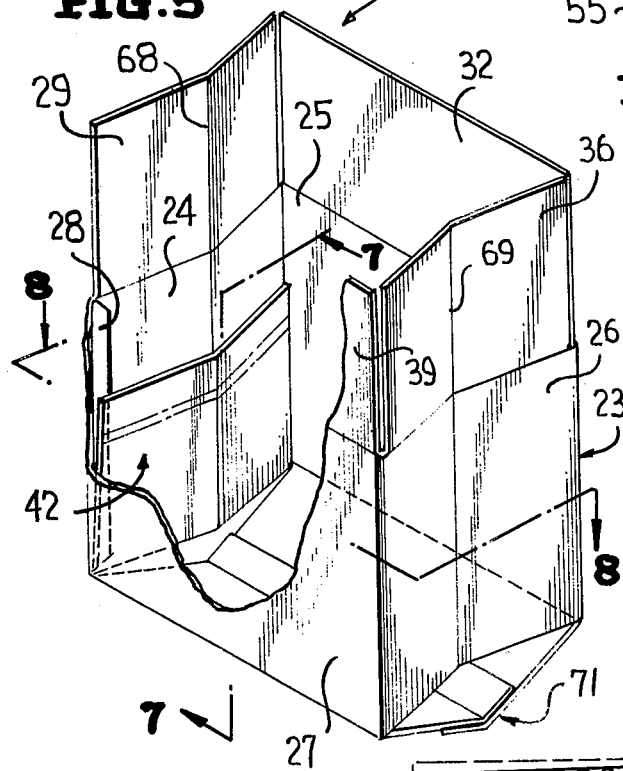
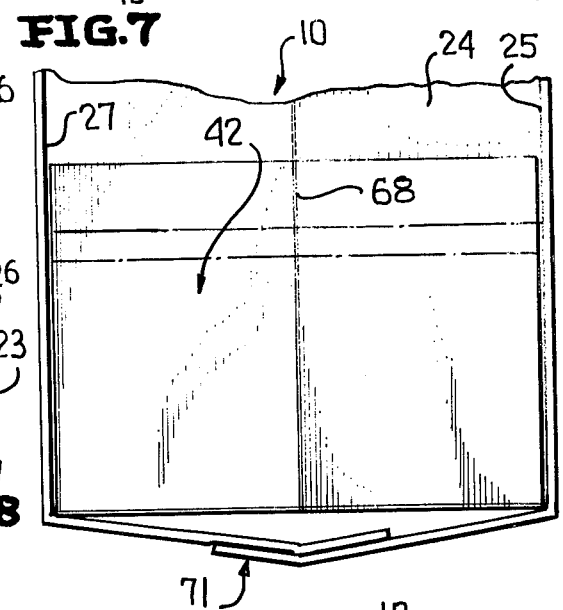
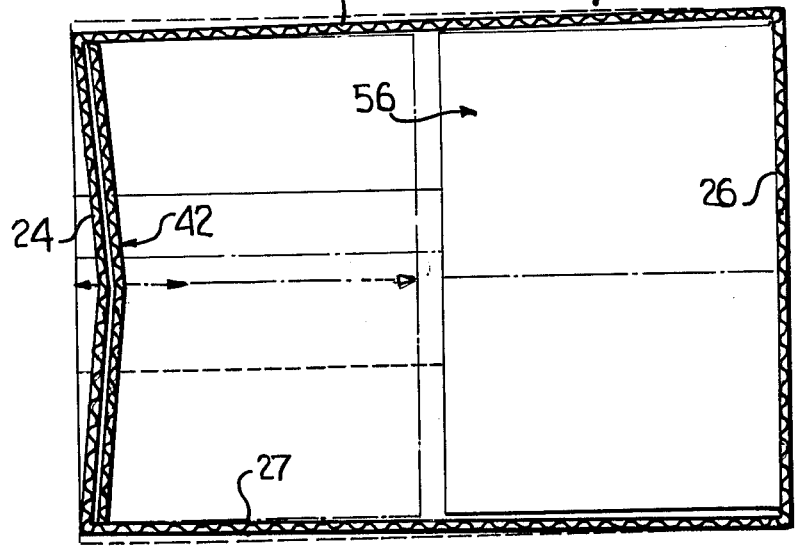

REUSABLE, COLLAPSIBLE SHIPPING CONTAINER

A primary object of this invention is to provide a novel container which includes transversely hinged end and side panels, top and bottom flaps longitudinally hinged to the end and side panels, the bottom flaps of the side panels each has a longitudinal hinge line dividing each bottom flap into first and second portions, the bottom flaps of the side panels are secured to each other thereby providing a bottom panel which has a generally centrally located longitudinal hinge line, and the end panels and their respective top and bottom flaps each have a generally centrally located transverse hinge line whereby inwardly folding of the transverse hinge lines of the end panels simultaneously with outboard folding of the longitudinal hinge line of the bottom panel allows the container to move from a set-up to a collapsed condition.

Another object of this invention is to provide a container of the type set forth wherein the overlapping of the first and second portions of one bottom flap of one of the side panels relative to the second and first flap portions of the other of the second bottom flaps of the second side panel respectively thereby providing a strong longitudinal hinge line which enables the container to be repeatedly reused.

Yet another object of the invention is the construction of the bottom flaps of the end panels which provide locking with the side panels when the container is moved to the set-up condition.

Still another object of the invention is the provision of a cut line carried by one of the top flaps of the side panels for receiving a portion of the other top flap of another side panel when the top flaps are moved to a closed position.

BRIEF DESCRIPTION OF THE DRAWINGS

FIG. 4 is a perspective view of the fully assembled container blank of FIG. 1, and illustrates the container in a fully collapsed condition.

FIG. 5 is a perspective view with a portion broken away for clarity, and illustrates the container resting on its bottom panel in a partially set-up condition.

FIG. 6 is a fragmentary enlarged perspective side view, and illustrates in more detail the assembled bottom panel of the collapsed container of FIG. 4.

FIG. 7 is a sectional view taken generally along line 7—7 of FIG. 5, and illustrates the partially set-up container.

FIG. 8 is a sectional view taken generally along line 8—8 of FIG. 5, and illustrates the partially set-up container.

Figure 1:
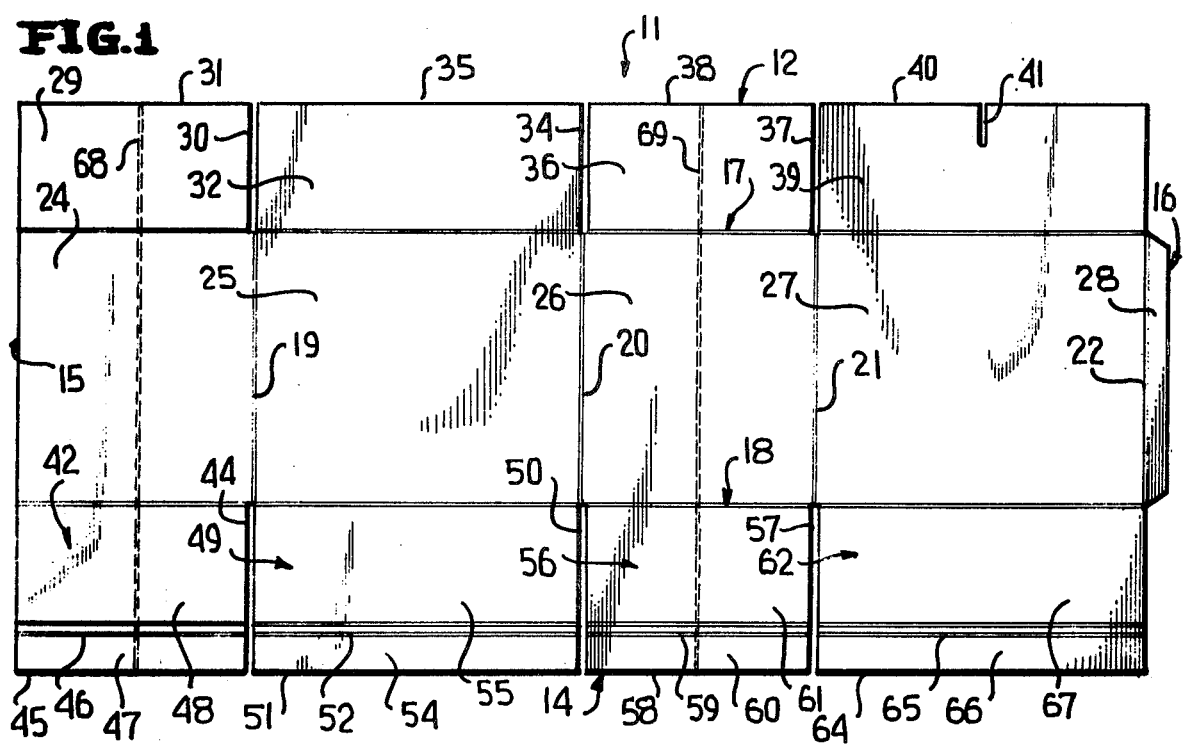
FIG. 1 is a top plan view of a container blank constructed in accordance with this invention, and illustrates longitudinal and transverse hinge lines for allowing collapsing and setting up of a container formed from the blank.

A novel container constructed in accordance with the present invention is fully illustrated in FIGS. 2 through 5 of the drawings, and is generally designated by the reference numeral 10. The container 10 is preferably constructed from corrugated board or similar paper stock material by appropriately forming a container blank 11 which is fully illustrated in FIG. 1 of the drawings.

The container blank 11 is formed by a pair of generally parallel, spaced longitudinal edges 12, 14, and a pair of generally parallel, spaced transverse edges 15, 16.

The container blank 11 includes a pair of generally parallel, spaced longitudinal hinge or fold lines 17, 18, and generally parallel, spaced transverse hinge or fold lines 19, 20, 21, 22.

A first end panel 24 is defined by a portion of the longitudinal hinge line 17, a portion of the longitudinal hinge line 18, a portion of the transverse edge 15 and the transverse hinge line 19 whereby the first end panel 24 is transversely hinged to a first side panel 25.

The first side panel 25 is defined by a portion of the longitudinal hinge line 17, a portion of the longitudinal hinge line 18, and the transverse hinge lines 19, 20 whereby the transverse hinge line 20 hingedly secures the first side panel 25 to a second end panel 26.

The second end panel 26 is defined by a portion of the longitudinal hinge line 17, a portion of the longitudinal hinge line 18, and the transverse hinge line 20, 21 whereby the transverse hinge line 21 hingedly secures the second end panel 26 to a second side panel 27.

The second side panel 27 is defined by a portion of the longitudinal hinge line 17, a portion of the longitudinal hinge line 18, and the transverse hinge lines 21, 22 whereby the transverse hinge line 22 hingedly secures the second side panel 27 to a tab 28.

A tab 28 is defined by a portion of the transverse edge 16, and the transverse hinge line 22. The tab 28 is adapted to be adhesively secured to a portion of the first end panel 24 when the container blank 11 is partially assembled (FIG. 2) to form a body portion 23. The body portion 23 includes the panels 24, 25, 26, 27 and tab 28 wherein the panels 24, 25, 26, 27 each have a top end (unnumbered) and a bottom end (unnumbered).

The container blank 11 further includes a top flap 29 defined by a portion of the transverse edge 15, a transverse cut line or slot 30, a longitudinal edge 31, and a portion of the longitudinal hinge line 17 whereby the top flap 29 is longitudinally hinged to the first end panel 24.

A top flap 32 is defined by the transverse cut line or slot 30, a transverse cut line or slot 34, a longitudinal edge 35, and a portion of the longitudinal hinge line 17 whereby the top flap 32 is longitudinally hinged to the first side panel 25.

A top flap 36 is defined by the transverse cut line or slot 34, a transverse cut line or slot 37, a longitudinal edge 38, and a portion of the longitudinal hinge line 17 whereby the top flap 36 is longitudinally hinged to the second end panel 26.

A top flap 39 is defined by the transverse cut line or slot 37, a portion of the transverse edge 16, a longitudinal edge 40, and a portion of the longitudinal hinge line 17 whereby the top flap 39 is longitudinally hinged to the second side panel 27.

The top flap 39 has a generally transverse cut line or slot 41 that extends generally normal from the longitudinal edge 40 toward a portion of the longitudinal hinge line 17. The transverse cut line or slot 41 is adapted to receive a portion of the top flap 36 when the container 10 is set-up and its top flaps 29, 32, 36, 39 are closed whereby the top flaps 32, 39 interlock.

The container blank 11 further includes a bottom flap 42 defined by a portion of the transverse edge 15, a transverse cut line or slot 44, a longitudinal edge 45, and a portion of the longitudinal hinge line 18 whereby the bottom flap 42 is longitudinally hinged to the first end panel 24. The bottom flap 42 has a longitudinal hinge or fold line 46 which divides the bottom flap 42 into a first portion 47 and a second portion 48.

A bottom flap 49 is defined by the transverse cut line or slot 44, a transverse cut line or slot 50, a longitudinal edge 51, and a portion of the longitudinal hinge line 18 whereby the bottom flap 49 is longitudinally hinged to the first side panel 25. The bottom flap 49 has a longitudinal hinge or fold line 52 lying in general alignment with the longitudinal hinge or fold line 46 wherein the longitudinal hinge or fold line 52 divides the bottom flap 49 into a first portion 54 and a second portion 55.

A bottom flap 56 is defined by the transverse but line or slot 50, a transverse cut line or slot 57, a longitudinal edge 58, and a portion of the longitudinal hinge line 18 whereby the bottom flap 56 is longitudinally hinged to the second end panel 26. The bottom flap 56 has a longitudinal hinge or fold line 59 lying in general alignment with the longitudinal hinge or fold line 46 wherein the longitudinal hinge or fold line 59 divides the bottom flap 56 into a first portion 60 and a second portion 61.

A bottom flap 62 is defined by the transverse cut line or slot 57, a portion of the transverse edge 16, a longitudinal edge 64, and a portion of the longitudinal hinge line 18 whereby the bottom flap 62 is longitudinally hinged to the second side panel 27. The bottom flap 62 has a longitudinal hinge or fold line 65 lying in general alignment with the transverse hinge or fold line 46 wherein the longitudinal hinge or fold line 65 divides the bottom flap 62 into a first portion 66 and a second portion 67.

The first end panel 24 and its respective flaps 29, 42 have a generally centrally located transverse hinge or fold line 68. The second end panel 26 and its respective flaps 36, 56 have a generally centrally located transverse hinge or fold line 69. The transverse hinge or fold lines 68, 69 provide inward movement of their respective first and second end panels 24, 26 and flaps 29, 42 and 36, 56 when the container 10 is moved from a set-up condition to a collapsed condition, as shown in FIGS. 5 and 4, respectively.

Figure 2:
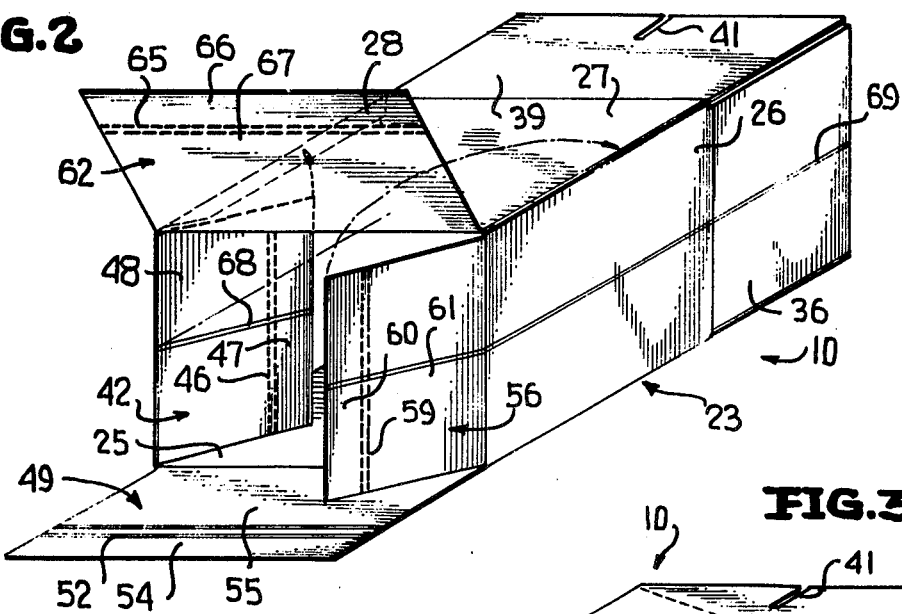
FIG. 2 is a perspective view of a partially formed container, and illustrates the container lying on a side panel prior to completed assembly.
Figure 3:
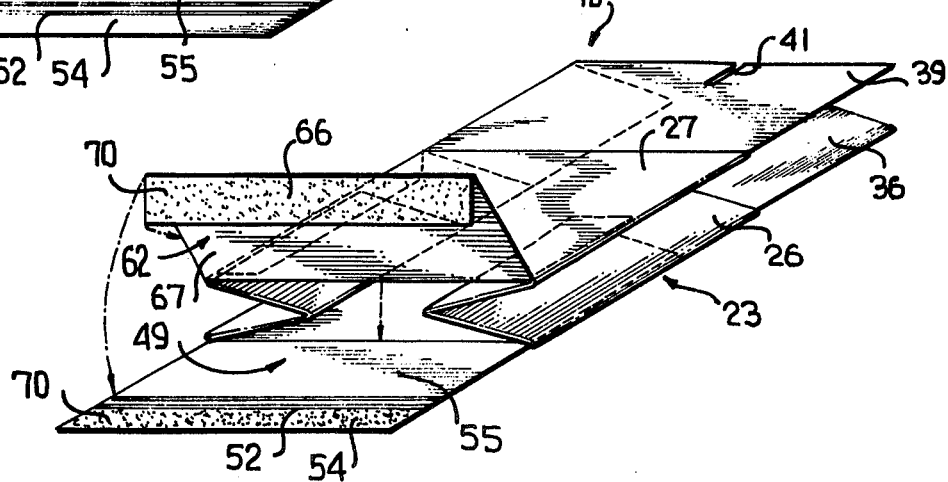
FIG. 3 is a perspective view similar to FIG. 2, and illustrates the container in a partially collapsed condition.

The container blank 11 is assembled to form the container 10 by folding the first and second end panels 24, 26 generally normal to the first side panel 25, folding the second side panel 27 generally parallel to the first side panel 25, and adhesively or otherwise securing the tab 28 to an inboard portion of the first end panel 24, as shown in FIG. 2. The bottom flaps 42, 56 are folded inboard and generally parallel to their respective first and second end panels 24, 26 as is illustrated in FIG. 2. The first and second end panels 24, 26 and their respective top and bottom flaps 29, 42, 36, 56 are folded inwardly along their respective transverse hinge or fold lines 68, 69 whereby the container 10 is placed in a collapsed condition as is illustrated in FIG. 3. The bottom flap 62 is folded along its longitudinal hinge or fold line 65. The first portion 66 of the bottom flap 62 is secured by adhesive 70 to the second portion 55 of the bottom flap 49 whereby the longitudinal hinge or fold line 65 is placed in general alignment with the longitudinal hinge or fold line 52. The first portion 54 of the bottom flap 49 is secured by adhesive 70 to the second portion 67 of the bottom flap 62 forming a bottom panel 71, as is illustrated in FIG. 6, thus completing the assembling of the container 10 (FIG. 4).

The container 10 can be readily set-up from the collapsed position (FIG. 4) to a set-up position (FIG. 5) by exerting a generally outward force from within the container 10 on the transverse hinge or fold lines 68, 69 whereby the first and second end panels 24, 26 are positioned generally normal to the first and second side panels 25, 27, and the bottom panel 71 is automatically positioned generally normal to the first and second end and side panels 24, 25, 26, 27, as is illustrated generally in FIGS. 7 and 8. The bottom flaps 42, 56 are moved to a position generally parallel to the bottom panel 71 thereby allowing the container 10 to remain in the set-up condition, as is illustrated in FIG. 8.

I claim:

1. A reusable collapsible shipping container comprising a body portion including first and second end panels hingedly connected to a first side panel on opposite sides thereof, a second side panel hingedly connected to said second end panel on the other side thereof parallel to said opposite sides, a tab hingedly connected to said second side panel on its remaining side parallel to said opposite sides, said tab being secured to a portion of said first end panel, said first and second end and side panels when viewed in top plan being of a generally polygonal configuration, said first and second end panels each having a generally centrally located hinge line whereby said first and second end panels are capable of folding inwardly of said first and second side panels thereby allowing said body portion to collapse to a generally flat condition, said first and second end and side panels each having a top end and a bottom end, first and second top flaps hingedly connected to said top ends of said first and second end panels respectively, third and fourth top flaps hingedly connected to said top ends of said first and second side panels respectively, each centrally located hinge line extending from each respective end panel to and through each respective top flap, said top flaps being movable relative to said body portion whereby said container can be opened or closed, first and second bottom flaps hingedly connected to said bottom ends of said first and second end panels respectively, third and fourth bottom flaps hingedly connected to said bottom ends of said first and second side panels respectively, each centrally, located hinge line extending from each respective end panel to and through each respective bottom flap, each of said third and fourth bottom flaps having a hinge line dividing said third and fourth bottom flaps into first and second portions, said bottom flap first portions being positioned outermost from said body portion, said bottom flap hinge lines being positioned generally normal with respect to said centrally located hinge lines, said first and second bottom flaps being positioned generally normal relative to said first and second end panels, said third and fourth bottom flaps being positioned generally normal relative to said first and second side panels with their respective hinge lines in general overlapping alignment, said first and second bottom flaps being inboard of said third and fourth bottom flaps, means for securing said third and fourth bottom flaps to each other to form a bottom panel, and said bottom panel being capable of being folded generally in half along said aligned hinge lines of said third and fourth bottom flaps when said container is collapsed and said bottom panel moves outwardly from said body portion.

2. The container as defined in claim 1 wherein said first and second top flaps are inboard of said third and fourth top flaps, one of said top flaps has a cut line that extends from an outermost edge of said one top flap generally toward its associated side panel, and an outermost portion of another of said top flaps is received by the cut defined by said cut line thereby causing said third and fourth top flaps to interlock.

3. The container as defined in claim 1 wherein in the generally normal position said first portion of one of said third and fourth bottom flaps lies in overlapping arrangement with said second portion of the other of said third and fourth bottom flap, and said securing means is adhesive disposed between said overlapping portions.

4. The container as defined in claim 2 wherein said third and fourth bottom flaps in the generally normal position thereof each have respective first and second portions overlapping each other, and securing means is adhesive disposed between said overlapping portions.

5. A reusable collapsed shipping container comprising a body portion including first and second end panels hingedly connected to a first side panel on opposite sides thereof, a second side panel hingedly connected to said second end panel on the other side thereof parallel to said opposite sides, a tab hingedly connected to said second side panel on its remaining side parallel to said opposite sides, said tab being fixedly secured to a portion of said first end panel, said first and second end panels each having a generally centrally located hinge line along which it is folded inwardly whereby said body portion is in a generally collapsed flat condition, said first and second end and side panels each having a top end and a bottom end, first and second top flaps hingedly connected to said top ends of said first and second side panels respectively, third and fourth top flaps hingedly connected to said top ends of said first and second side panels respectively, said first and second top flaps each having a generally centrally located hinge line disposed in general alignment with said hinge line of said first and second end panels respectively along which it is folded inwardly, said third and fourth top flaps being positioned generally parallel to each other and in general alignment with said first and second side panels respectively, said first and second top flaps being inboard of said third and fourth top flaps in the collapsed condition of the container, first and second bottom flaps hingedly connected to said bottom ends of said first and second end panels respectively, third and fourth bottom flaps hingedly connected to said bottom ends of said first and second side panels respectively, said first and second bottom flaps each having a generally centrally located hinge line disposed in general alignment with said hinge line of said first and second end panels respectively and about which it is folded inwardly, each of said third and fourth bottom flaps having a hinge line dividing each third and fourth bottom flap into first and second portions, said bottom flap first portions being positioned outermost from said body portion, said first and second bottom flaps being positioned inboard of and generally parallel to said folded first and second end panels respectively, said third and fourth bottom flap second portions extending outwardly from said first and second side panel bottom ends and parallel to said first and second side panels respectively, said fourth bottom flap first portion being sandwiched between said fourth bottom flap second portion and said third bottom flap second portion, said third bottom flap first portion being in external overlying relationship to said fourth bottom flap second portion, said hinge lines of said third and fourth flaps being in generally overlying alignment, and means for securing said third and fourth bottom flaps to each other.

6. The container as defined in claim 5 wherein said first and second top flaps are inboard of said top flaps, one of said third and fourth top flaps has a cut line that extends from an outermost edge of said one top flap generally towards its associated side panel, and an outermost portion of another of said top flaps is received by the cut defined by said cut line thereby causing said third and fourth top flaps to interlock.

7. The container as defined in claim 6 wherein said securing means is adhesive disposed at least between said fourth bottom flap second portion and said third bottom flap first portion.

8. The container as defined in claim 5 wherein said securing means is adhesive disposed at least between said fourth bottom flap second portion and said third bottom flap first portion.

9. A container blank comprising a scored and cut sheet of material, said sheet including first and second end panels transversely hinged to a first side panel, a second side panel being transversely hinged to said second end panel, a tab being transversely hinged to said second side panel, said first and second end and side panels each having a top end and a bottom end, a top flap being longitudinally hinged to said top end of each of said first and second end and side panels, a bottom flap being longitudinally hinged to said bottom end of each of said first and second end and side panels, said bottom flaps each having a longitudinal hinge line dividing each bottom flap into first and second portions, said longitudinal hinge lines of said bottom flaps being positioned in generally longitudinal alignment with each other, and said first and second end panels, and their respective top and bottom flaps having a generally centrally located transverse hinge line whereby upon the setting up of said container blank into a container the latter is collapsible by relative folding movement of said first and second panels about said transverse hinge lines and by relative folding movement of said bottom flaps of at least said first and second side panels about said dividing longitudinal hinge line.

10. The container blank as defined in claim 9 wherein one of said top flaps of said first and second side panels has a transverse cut line extending generally normal from an outermost edge of said one top flap toward its associated side panel whereby said cut line is adapted to receive an outermost portion of another top flap allowing said one and opposing top flaps to interlock when said container blank is in its set-up position.

11. A reusable shipping container having a collapsed condition and an erected condition, said container comprising a pair of end panels, a pair of side panels, said end and side panels being alternately hingedly connected, a tab being hingedly connected to one of said side panels, said tab being further secured to a portion of one of said end panels wherein said end and side panels in a top plan view form a generally polygonal configuration, said end and side panels each having respective top and bottom ends, said ends and side panels each having a top flap hingedly connected to said top ends, said end and side panels each having a bottom flap hingedly connected to said bottom end, said end panels each having a generally centrally located hinge line extending from each of said end panels outwardly to each of said end panels respective top and bottom panels thereby allowing said end panels and respective top and bottom flaps to fold inwardly with respect to said side panels in the collapsed condition, said side panels' respective bottom flaps each having a hinge line dividing said respective bottom flaps into first and second portions, means for securing said respective bottom flaps together wherein said first portion of one of said respective bottom flaps lies in overlapping arrangement with said second portion of another of said respective bottom flaps whereby said respective bottom flap hinge lines are in alignment with one another, said respective bottom flaps being secured together to form a bottom panel, said bottom panel being foldable along said aligned hinge lines allowing said bottom panel to fold generally in half and move outwardly parallel to said respective side panels when said container is moved to the collapsed condition, and one of said top flaps having a cut line positioned thereon whereby the cut defined by said cut line will interlock with an opposing top flap when said top flaps are moved inward towards a closed position of said container.

* * * * *